US012791116B2

(12) United States Patent
Kumao et al.

(10) Patent No.: US 12,791,116 B2
(45) Date of Patent: Nov. 10, 2026

(54) VALVE UNIT, LIQUID EJECTION DEVICE, AND MANUFACTURING METHOD FOR VALVE UNIT

(71) Applicant: SEIKO EPSON CORPORATION, Tokyo (JP)

(72) Inventors: Shogo Kumao, Shiojiri (JP); Takayoshi Mizuno, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 163 days.

(21) Appl. No.: 18/435,470

(22) Filed: Feb. 7, 2024

(65) Prior Publication Data

US 2024/0271711 A1 Aug. 15, 2024

(30) Foreign Application Priority Data

Feb. 10, 2023 (JP) ................................ 2023-018977

(51) Int. Cl.
*F16K 31/126* (2006.01)
*B32B 3/28* (2006.01)
(Continued)

(52) U.S. Cl.
CPC ............ *F16K 31/1262* (2013.01); *B32B 3/28* (2013.01); *B32B 7/12* (2013.01); *B32B 27/08* (2013.01); *B32B 27/32* (2013.01); *B32B 27/36* (2013.01); *B32B 37/12* (2013.01); *B41J 2/17556* (2013.01); *B41J 2/17596* (2013.01); *F16K 27/02* (2013.01); *F16K 31/1266* (2013.01); *F16K 99/0005* (2013.01); *F16K 99/0015* (2013.01); *F16K 99/0057* (2013.01); *G05D 16/0663* (2013.01); *G05D 16/0666* (2013.01); *G05D 16/0669* (2013.01);
(Continued)

(58) Field of Classification Search
None
See application file for complete search history.

(56) References Cited

U.S. PATENT DOCUMENTS 5,741,566 A * 4/1998 Hogstrom ................ B32B 7/12
53/425
2007/0221079 A1* 9/2007 Aruga ...................... B41J 2/175
101/483
(Continued)

FOREIGN PATENT DOCUMENTS

JP 2011-046070 A 3/2011

*Primary Examiner* — Atif H Chaudry
(74) *Attorney, Agent, or Firm* — WORKMAN NYDEGGER

(57) ABSTRACT

A valve unit includes a pressure chamber whose volume changes in accordance with change in pressure of ink. The pressure chamber is formed by a liquid storage member in which is formed a recess section storing the ink. A second membrane member is arranged to cover an opening of the recess section. The second membrane member includes a first film connected to the liquid storage member to cover the opening, a second film that is adhered to a surface of the first film opposite a surface of the first film facing the opening and that suppresses permeation of a solvent component, and a third film that is arranged at a surface of the second film opposite a surface of the second film facing the first film and that suppresses permeation of moisture contained in surrounding air. The third film is separated from the second film by a space.

7 Claims, 10 Drawing Sheets

(51) Int. Cl.

| | |
|---|---|
| ***B32B 7/12*** | (2006.01) |
| ***B32B 27/08*** | (2006.01) |
| ***B32B 27/32*** | (2006.01) |
| ***B32B 27/36*** | (2006.01) |
| ***B32B 37/12*** | (2006.01) |
| ***B41J 2/175*** | (2006.01) |
| ***F16K 27/02*** | (2006.01) |
| ***F16K 99/00*** | (2006.01) |
| ***G05D 16/06*** | (2006.01) |

(52) U.S. Cl.

CPC ....... *B32B 2255/10* (2013.01); *B32B 2255/26* (2013.01); *B32B 2307/724* (2013.01); *B32B 2307/7265* (2013.01)

(56) References Cited

U.S. PATENT DOCUMENTS

| | | | | |
|---|---|---|---|---|
| 2012/0194608 | A1* | 8/2012 | Matsumoto | B41J 2/17509 347/85 |
| 2014/0184699 | A1* | 7/2014 | Ito | B41J 2/17556 347/54 |
| 2017/0217199 | A1* | 8/2017 | Yamagishi | B41J 2/175 |

* cited by examiner

VALVE UNIT, LIQUID EJECTION DEVICE, AND MANUFACTURING METHOD FOR VALVE UNIT

The present application is based on, and claims priority from JP Application Serial Number 2023-018977, filed Feb. 10, 2023, the disclosure of which is hereby incorporated by reference herein in its entirety.

BACKGROUND

1. Technical Field

The present disclosure relates to a valve unit, a liquid ejection device, and a manufacturing method for a valve unit.

2. Related Art

In a liquid ejection device, there is known a configuration for adjusting pressure of liquid in which a liquid storage chamber whose volume changes in accordance with change in pressure of liquid is arranged between a head that ejects liquid and a liquid supply source. The liquid storage chamber is configured by covering an opening section of a container-shaped structure in which liquid is stored with a membrane member having flexibility. As such a membrane member, for example, a member is used including a configuration in which an inner membrane made of polypropylene (PP) and an outer membrane made of polyethylene terephthalate (PET) are laminated. However, in the case of such a configuration, moisture in surrounding air permeates through the outer membrane, and thus a blister may be generated between the inner membrane and the outer membrane. Then, the size of the blister gradually increases, and the membrane member may be damaged.

JP-A-2011-46070 proposes a liquid sealing membrane member in which a PP film and a PET film are laminated, and a moisture proof film is laminated on the outside thereof. According to this configuration, since infiltration of moisture contained in surrounding air is suppressed by the moisture proof film, generation of a blister can be suppressed.

However, simply increasing the layer structure of the membrane member impairs the flexibility of the membrane member. In particular, since a film capable of suppressing permeation of moisture tends to have high rigidity, it may be difficult to appropriately adjust pressure of liquid.

SUMMARY

A valve unit includes a liquid storage chamber whose volume changes in accordance with change in pressure of liquid, wherein the liquid storage chamber is formed by a liquid storage member in which is formed a recess section storing the liquid, and a membrane member arranged so as to cover an opening of the recess section, the membrane member includes a first film connected to the liquid storage member so as to cover the opening, a second film that is adhered to a surface of the first film opposite from a surface of the first film facing the opening and that suppresses permeation of a predetermined component contained in the liquid, and a third film that is arranged at a surface of the second film opposite from a surface of the second film facing the first film and that suppresses permeation of moisture contained in surrounding air, and the third film is arranged separated from the second film by a space.

A liquid ejection device includes a liquid ejection head configured to eject liquid and a supply flow path connecting a liquid supply source and the liquid ejection head such that the liquid flows from the liquid supply source toward the liquid ejection head, wherein the supply flow path includes a valve unit including an inflow section into which the liquid flows from the liquid supply source, an outflow section from which the liquid flows toward the liquid ejection head, and a liquid storage chamber whose volume changes in accordance with change in pressure of the liquid, the liquid storage chamber is formed by a liquid storage member in which is formed a recess section storing the liquid, and a membrane member arranged so as to cover an opening of the recess section, the membrane member includes a first film connected to the liquid storage member so as to cover the opening, a second film that is adhered to a surface of the first film opposite from a surface of the first film facing the opening and that suppresses permeation of a predetermined component contained in the liquid, and a third film that is arranged at a surface of the second film opposite from a surface of the second film facing the first film and that suppresses permeation of moisture contained in surrounding air, and the third film is arranged separated from the second film by a space.

A manufacturing method for a valve unit, the valve unit including a liquid storage chamber that is formed by a liquid storage member in which is formed a recess section in which liquid is stored, and a membrane member that is arranged to cover an opening of the recess section, and whose volume changes in accordance with change in pressure of the liquid, the manufacturing method includes a step of arranging a laminated film formed by adhering a first film connected to the liquid storage member and a second film suppressing permeation of a predetermined component contained in the liquid so that a first film side faces the recess section, and connecting the laminated film to the liquid storage member and a step of arranging a third film that suppresses permeation of moisture contained in surrounding air separated from the laminated film by a space.

DESCRIPTION OF EMBODIMENTS

A liquid ejection device 1 of the present embodiment will be described below with reference to the drawings. The liquid ejection device 1 of the present embodiment is, for example, an inkjet type printer which records an image such as a character or a photograph on a medium by ejecting ink which is an example of liquid onto the medium which is a recording target. The medium is not limited to paper, and various materials such as textiles such as cloth and fabric, vinyl chloride resin, and the like can be used. In the present embodiment, printing on a medium other than paper is assumed, and ink containing a solvent is used as the ink.

In each of the drawings, an X-axis, a Y-axis, and a Z-axis intersecting with each other are shown. Typically, the X-axis, the Y-axis, and the Z-axis are orthogonal to each other. The X-axis is parallel to an installation surface of the liquid ejection device 1, and corresponds to a width direction of the liquid ejection device 1. The Y-axis is parallel to the installation surface of the liquid ejection device 1 and corresponds to a depth direction of the liquid ejection device 1. The Z-axis is perpendicular to the installation surface of the liquid ejection device 1 and corresponds to a height direction of the liquid ejection device 1.

A +X direction parallel to the X-axis is a direction toward the right toward a front surface of the liquid ejection device 1, and a −X direction parallel to the X-axis is a direction opposite to the +X direction. A +Y direction parallel to the Y-axis is a direction from a rear surface to the front surface of the liquid ejection device 1, and a −Y direction parallel to the Y-axis is a direction opposite to the +Y direction. A +Z direction parallel to the Z-axis is a downward direction, and a −Z direction parallel to the Z-axis is a direction opposite to the +Z direction.

Figure 1:
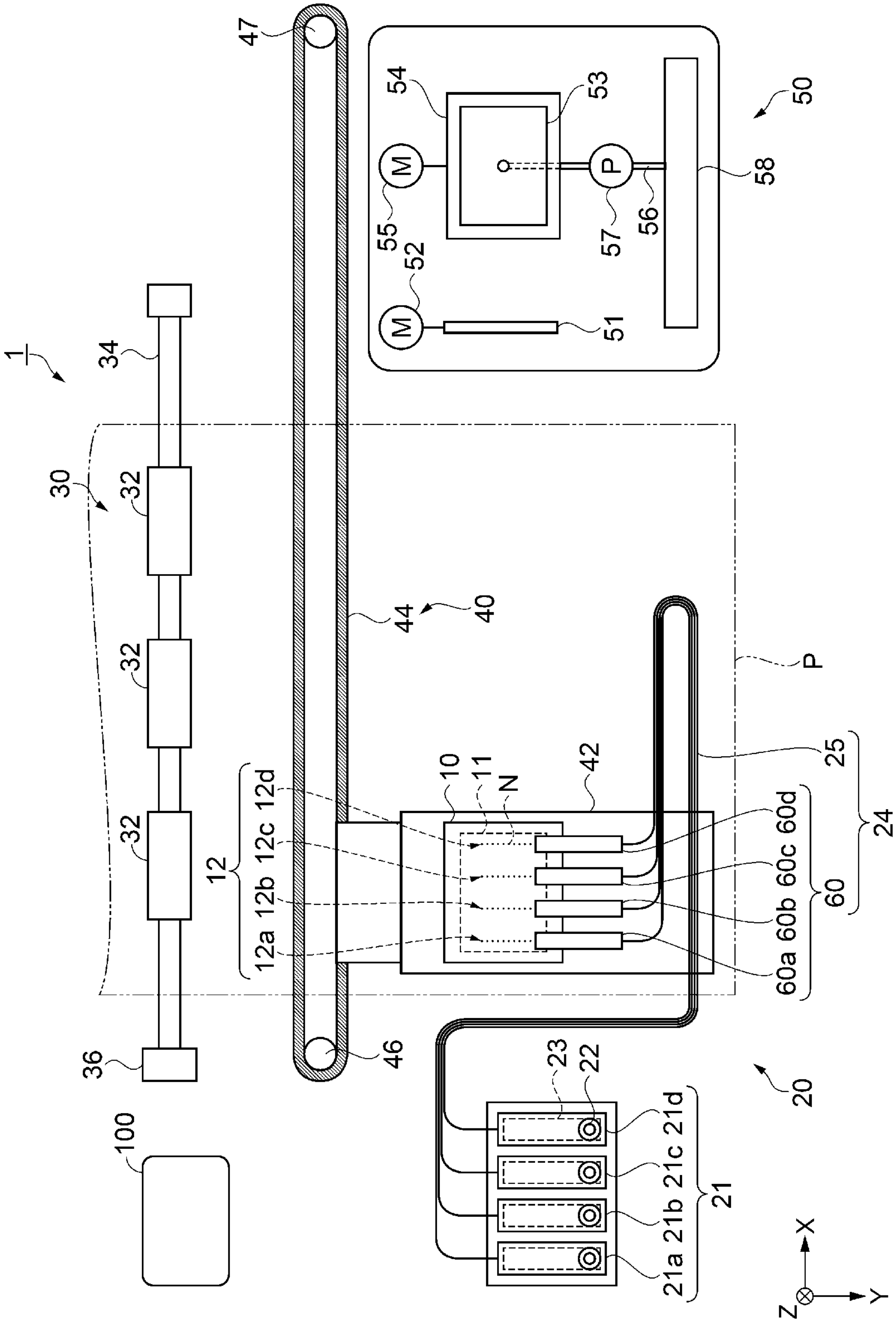
FIG. 1 is a configuration view showing a schematic configuration of a liquid ejection device.

FIG. 1 is a configuration view showing a schematic configuration of a liquid ejection device 1.

As shown in FIG. 1, the liquid ejection device 1 includes a liquid ejection head 10, an ink supply section 20, a transport mechanism 30, a movement mechanism 40, a maintenance section 50, and a control section 100.

The liquid ejection head 10 has a nozzle surface 11 on which a plurality of nozzle arrays 12 for ejecting ink are provided. The nozzle arrays 12 are formed by arranging a plurality of nozzles N in the ±Y direction. The liquid ejection head 10 ejects ink from a plurality of nozzles N constituting the nozzle arrays 12 in the +Z direction to form an image on a printing paper P as the medium. In the present embodiment, the plurality of nozzle arrays 12 include a nozzle array 12*a*, a nozzle array 12*b*, a nozzle array 12*c*, and a nozzle array 12*d*.

The inks to be ejected are, for example, inks of four colors in total of black, cyan, magenta, and yellow, and each ink is ejected from the nozzle array 12*a*, the nozzle array 12*b*, the nozzle array 12*c*, and the nozzle array 12*d*. The ink is not limited to the four colors described above, and a configuration may be adopted in which ink of other colors such as light cyan, light magenta, and white is ejected. The liquid ejection head 10 is mounted on a carriage 42 (to be described later) included in the movement mechanism 40, and reciprocates in a main scanning direction together with the movement of the carriage 42. In the present embodiment, the main scanning direction is the ±X direction.

The ink supply section 20 supplies ink to the liquid ejection head 10. The ink supply section 20 includes liquid supply sources 21 and supply flow paths 24. The liquid supply sources 21 of the present embodiment are refill type tanks including inlet sections 22 into which ink can be introduced and accommodation chambers 23 for accommodating the ink introduced from the inlet sections 22, but may be a replaceable cartridge type tanks. The ink supply section 20 includes a plurality of liquid supply sources 21. In the present embodiment, the plurality of liquid supply sources 21 include a liquid supply source 21*a* for accommodating black ink, a liquid supply source 21*b* for accommodating cyan ink, a liquid supply source 21*c* for accommodating magenta ink, and a liquid supply source 21*d* for accommodating yellow ink.

The supply flow paths 24 connect the liquid supply sources 21 and the liquid ejection head 10 so that ink accommodated in the liquid supply sources 21 flows toward the liquid ejection head 10. The supply flow paths 24 of the present embodiment are constituted by valve units 60 arranged on the carriage 42 and connected to the liquid ejection head 10, and tubes 25 connecting the liquid supply sources 21 and the valve units 60. Hereinafter, in the supply flow paths 24, a side closer to the liquid supply sources 21 is also referred to as an upstream side, and a side closer to the liquid ejection head 10 is also referred to as a downstream side.

The valve units 60 adjust pressure of ink supplied to the liquid ejection head 10 to a predetermined negative pressure. Therefore, in the present embodiment, there is less restriction on positions of the liquid supply sources 21 in the ±Z direction. For example, the liquid supply sources 21 can be arranged at positions where the liquid surfaces of ink in the liquid supply sources 21 are in the −Z direction from the nozzle surface 11 of the liquid ejection head 10. The supply flow paths 24 are provided with a plurality of valve units 60. In the present embodiment, the plurality of valve units 60 include a valve unit 60*a* for supplying ink from the liquid supply source 21*a* to the nozzle array 12*a*, a valve unit 60*b* for supplying ink from the liquid supply source 21*b* to the nozzle array 12*b*, a valve unit 60*c* for supplying ink from the liquid supply source 21*c* to the nozzle array 12*c*, and a valve unit 60*d* for supplying ink from the liquid supply source 21*d* to the nozzle array 12*d*. Details of the valve units 60 will be described later.

The transport mechanism 30 transports the printing paper P in a sub-scanning direction. The sub-scanning direction is a direction orthogonal to the ±X direction, which is the main scanning direction, and is the ±Y direction in the present embodiment. The transport mechanism 30 includes a transport rod 34 on which three transport rollers 32 are mounted, and a transport motor 36 that rotationally drives the transport rod 34. When the transport motor 36 rotationally drives the transport rod 34, the plurality of transport rollers 32 are rotated, and the printing paper P is transported in the +Y direction in the sub-scanning direction. The number of the transport rollers 32 is not limited to three, and may be an arbitrary number. A configuration including a plurality of transport mechanisms 30 may be used.

The movement mechanism 40 includes a transport belt 44, a movement motor 46, and a pulley 47 in addition to the carriage 42 described above. The carriage 42 mounts the liquid ejection head 10 and the valve units 60. The carriage 42 is attached to the transport belt 44. The transport belt 44 is wound between the movement motor 46 and the pulley 47. By rotationally driving the movement motor 46, the transport belt 44 reciprocates in the main scanning direction. Accordingly, the carriage 42 attached to the transport belt 44 also reciprocates in the main scanning direction.

The maintenance section 50 performs maintenance of the liquid ejection head 10. The maintenance section 50 includes a wiper 51, a wiper drive section 52, a cap 53, a cap holding section 54, a cap drive section 55, a waste liquid tube 56, a suction pump 57, and a waste liquid collection section 58.

The wiper 51 wipes the nozzle surface 11 of the liquid ejection head 10. The wiper 51 is moved in the ±Z direction between a standby position where the wiper 51 is not in contact with the nozzle surface 11 and a wiping position where the wiper 51 can be in contact with the nozzle surface 11 by drive of the wiper drive section 52. With the wiper 51 at the wiping position, the liquid ejection head 10 moves in the main scanning direction on a −Z direction side of the wiper 51 together with movement of the carriage 42, whereby the nozzle surface 11 is wiped.

The cap 53 discharges ink from the nozzles N of the liquid ejection head 10. By coming into contact with the nozzle surface 11 of the liquid ejection head 10, the cap 53 forms a suction space into which the plurality of nozzles N open. The cap 53 is held by the cap holding section 54. The cap holding section 54 is moved in the ±Z direction by drive the cap drive section 55. As the cap holding section 54 moves in the ±Z direction, the cap 53 moves in the ±Z direction between a non-capping position at which the cap 53 does not come into contact with the nozzle surface 11 and a suckable position at which the cap 53 comes into contact with the nozzle surface 11. The cap 53 is in communication with the waste liquid collection section 58 for collecting waste liquid via the waste liquid tube 56. The waste liquid tube 56 is provided with a suction pump 57 for sucking the suction space formed by the cap 53.

When a maintenance of the liquid ejection head 10 by the cap 53 is performed, the liquid ejection head 10 is moved together with the carriage 42 in a state where the cap 53 is in the non-capping position, and the nozzle arrays 12*a*, 12*b*, 12*c*, and 12*d* are arranged at positions facing the cap 53. When the cap 53 is moved to the suckable position, the suction space into which the plurality of nozzles N constituting the nozzle arrays 12*a*, 12*b*, 12*c*, and 12*d* open is formed. By the suction pump 57 suctioning the formed suction space, ink is discharged into the suction space from the plurality of nozzles N constituting the nozzle arrays 12*a*, 12*b*, 12*c*, and 12*d*. Ink discharged into the suction space is collected in the waste liquid collection section 58 via the waste liquid tube 56.

The control section 100 controls the overall operation of the liquid ejection device 1. For example, the control section 100 controls a reciprocating movement operation of the carriage 42 along the main scanning direction, a transport operation of the printing paper P along the sub-scanning direction, an ink ejection operation of the liquid ejection head 10, and a maintenance operation of the liquid ejection head 10 by the maintenance section 50. The control section 100 may include, for example, a processing circuit such as a central processing unit (CPU) or a field programmable gate array (FPGA), and a storage circuit such as a semiconductor memory.

Next, the valve unit 60 will be described in detail.

Figure 2:
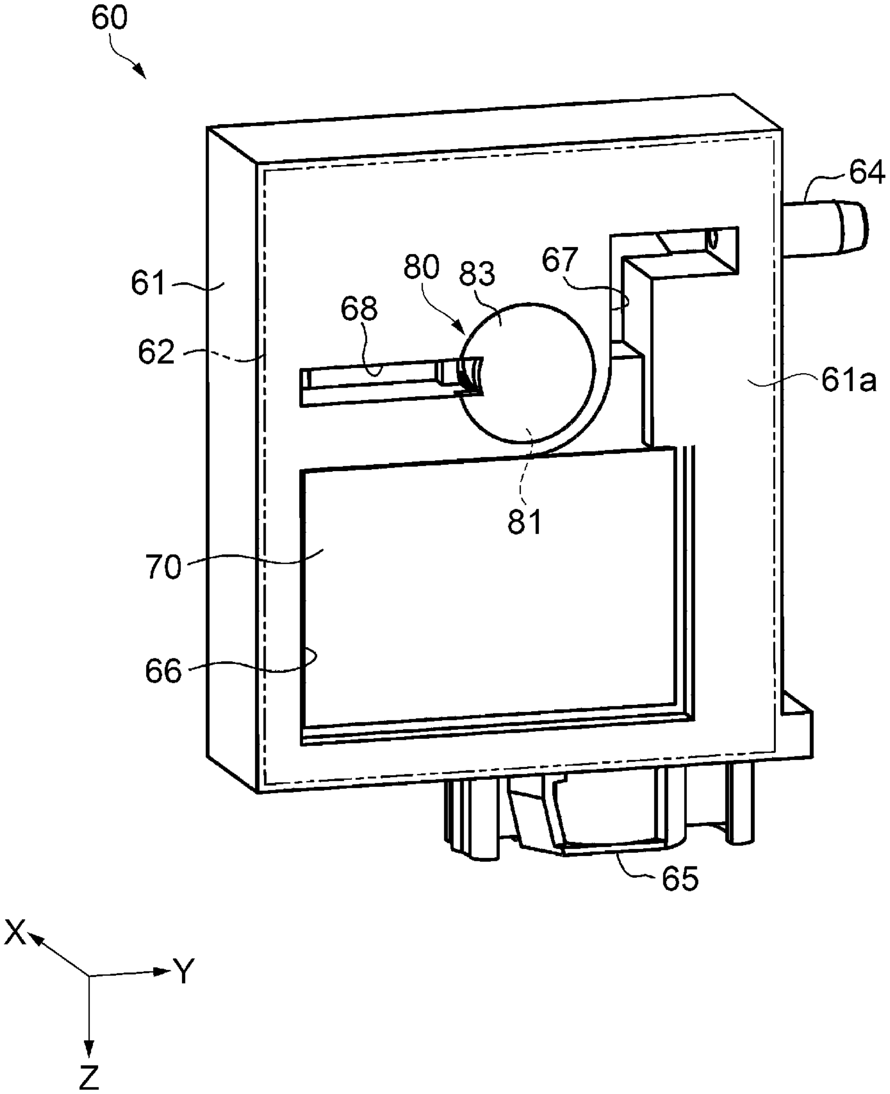
FIG. 2 is a perspective view showing a valve unit.
Figure 3:
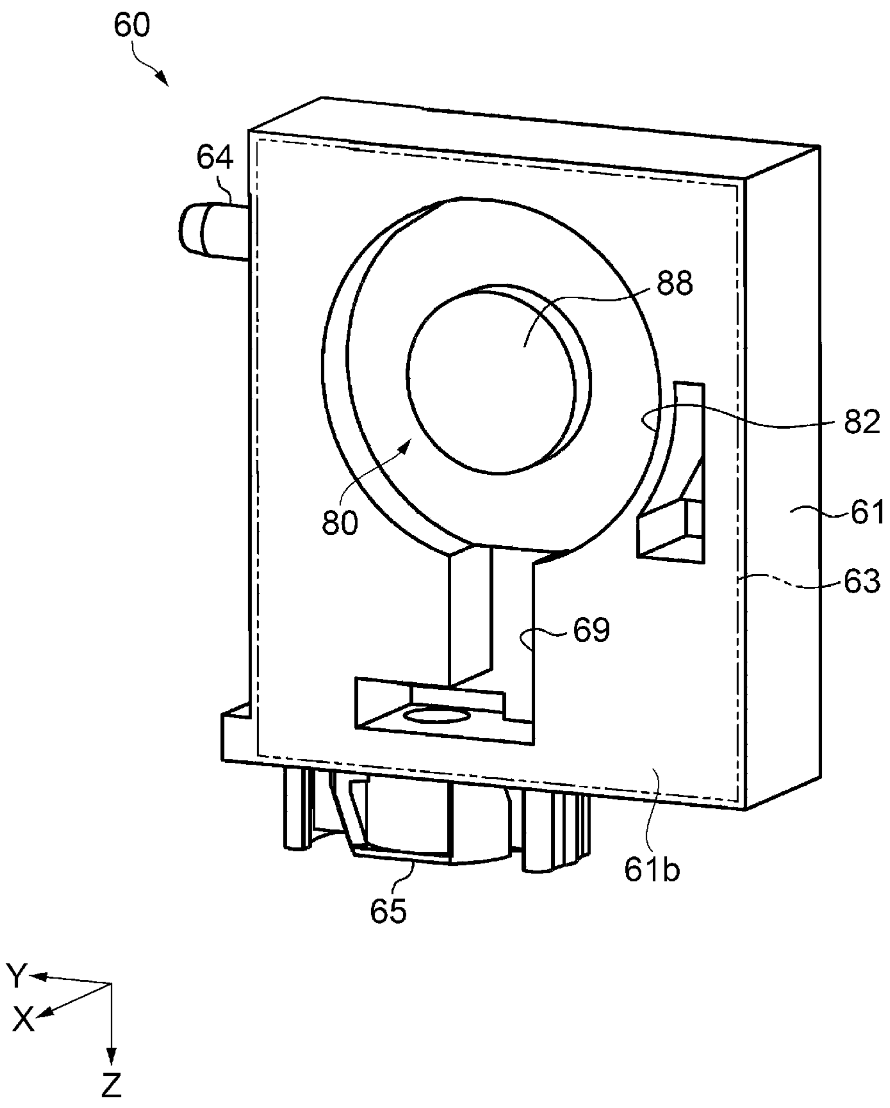
FIG. 3 is a perspective view showing the valve unit.

FIGS. 2 and 3 are perspective views showing the valve unit 60.

The valve unit 60 includes a liquid storage member 61 having a substantially rectangular parallelepiped outer shape, a first membrane member 62 that covers a first surface 61*a* of the liquid storage member 61, and a second membrane member 63 that covers a second surface 61*b* of the liquid storage member 61. The valve unit 60 includes a pressure adjustment mechanism 80, which adjusts pressure of ink supplied to the liquid ejection head 10, inside the liquid storage member 61.

The first surface 61*a* and the second surface 61*b* of the liquid storage member 61 are both surfaces along a YZ plane. The first surface 61*a* faces the −X direction, and the second surface 61*b* faces the +X direction. That is, the second surface 61*b* is the surface that is opposite from the first surface 61*a*. The states shown in FIGS. 2 and 3 are states before the first membrane member 62 and the second membrane member 63 are arranged, and positions where the first membrane member 62 and the second membrane member 63 are to be arranged are indicated in two dot chain line. The first membrane member 62 and the second membrane member 63 are membrane members having flexibility.

An inflow section 64 into which ink flows from the liquid supply source 21 is formed on a front surface of the liquid storage member 61 on a +Y direction side. An outflow section 65 from which ink flows toward the liquid ejection head 10 is formed on a lower surface of the liquid storage member 61 in the +Z direction. The liquid storage member 61 configures a flow path extending from the inflow section 64 to the outflow section 65, and configures a filter chamber 66, a supply chamber 81 (refer to FIG. 4), and a pressure chamber 82 which are arranged at positions along the flow path. The supply chamber 81 and the pressure chamber 82 constitute a pressure adjustment mechanism 80. In the present embodiment, the liquid storage member 61 is formed of polypropylene (PP) which is not easily deteriorated by ink containing a solvent.

A plurality of recess sections for storing ink are formed in the first surface 61*a* and the second surface 61*b* of the liquid storage member 61. A part of the flow path, the filter chamber 66, the supply chamber 81, and the pressure chamber 82 are formed by closing openings of these recess sections. Specifically, in the first surface 61*a* of the liquid storage member 61 are formed a recess section constituting the filter chamber 66, a recess section constituting the supply chamber 81, a recess section constituting an inflow flow path 67, and a recess section constituting a relay flow path 68. The supply chamber 81 is formed by closing an opening of the recess section with the receiving plate 83, and the filter chamber 66, the inflow flow path 67, and the relay flow path 68 are formed by covering openings of the recess sections with the first membrane member 62. The inflow section 64 communicates with the filter chamber 66 via the inflow flow path 67 or the like, and the filter chamber 66 communicates with the supply chamber 81 via the relay flow path 68 or the like.

On the second surface 61*b* of the liquid storage member 61 are formed a recess section constituting the pressure chamber 82 and a recess section constituting an outflow flow path 69. The pressure chamber 82 and the outflow flow path 69 are formed by covering openings of the recess sections with the second membrane member 63. That is, the pressure chamber 82 and the outflow flow path 69 are formed by the liquid storage member 61 and the second membrane member 63. The pressure chamber 82 communicates with the outflow section 65 via the outflow flow path 69. The pressure chamber 82 corresponds to a liquid storage chamber that stores ink to be supplied to the liquid ejection head 10. In addition, since the second membrane member 63 having flexibility is deformed in accordance with pressure change of ink, the volume of the pressure chamber 82 also changes in accordance with change in pressure of ink.

A filter 70 that filters ink flowing from the liquid supply source 21 is arranged in the filter chamber 66. The filter 70 includes a large number of holes through which ink can pass. As the filter 70, for example, a mesh-like body such as a wire mesh or a resin mesh, a porous body, or a metal plate including fine through holes formed therein can be used. Specific examples of the mesh-like body include a metal mesh filter and a metal fiber. The metal mesh filter is a filter formed by weaving wire, and includes filters of plain weave, twilled weave, plain dutch weave, twilled dutch weave, and the like. Ink flowing from the inflow section 64 is filtered by the filter 70 and then flows into the supply chamber 81 that constitutes the pressure adjustment mechanism 80.

Figure 4:
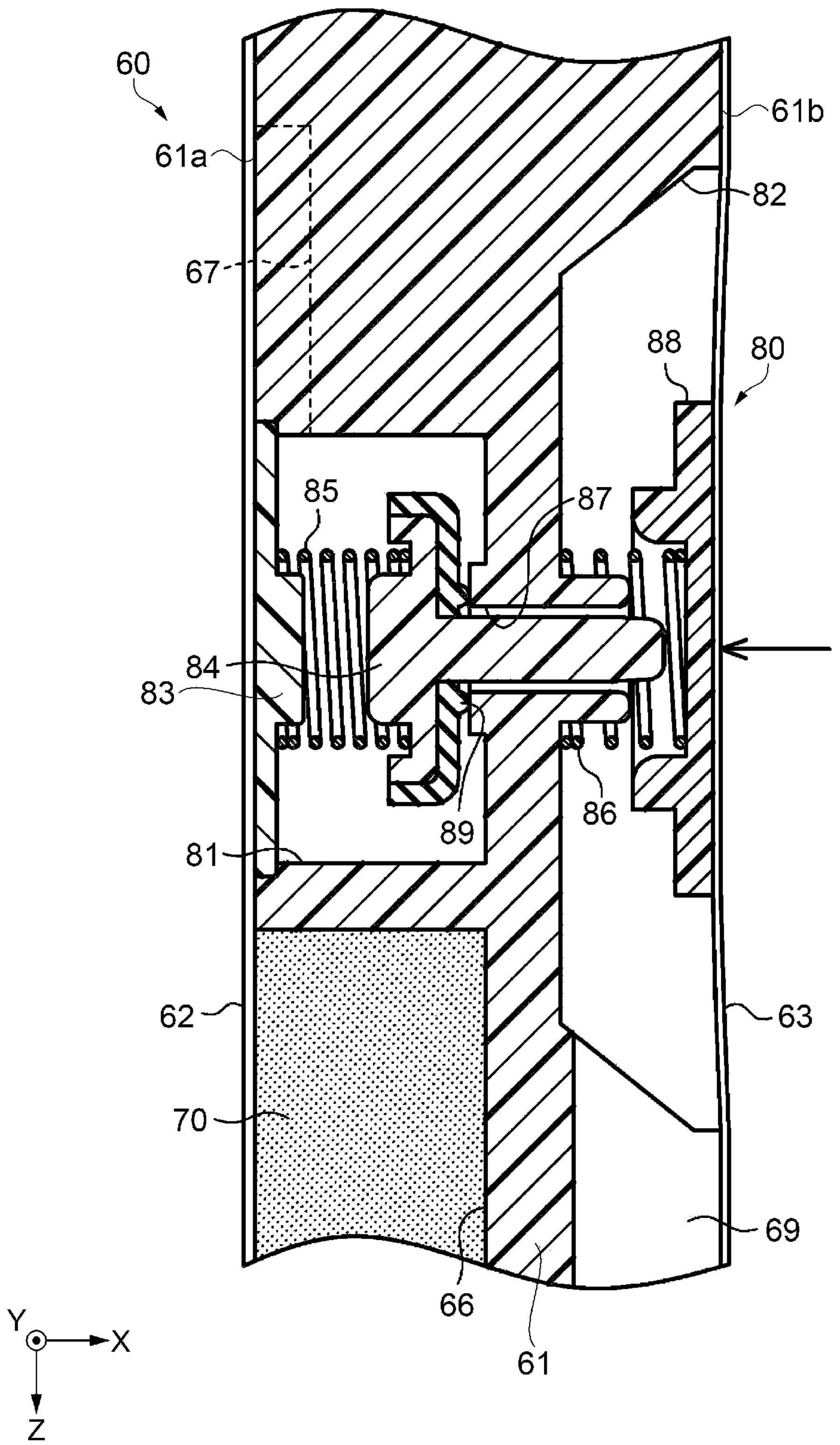
FIG. 4 is a cross-sectional view for explaining a configuration and an operation of a pressure adjustment mechanism.
Figure 5:
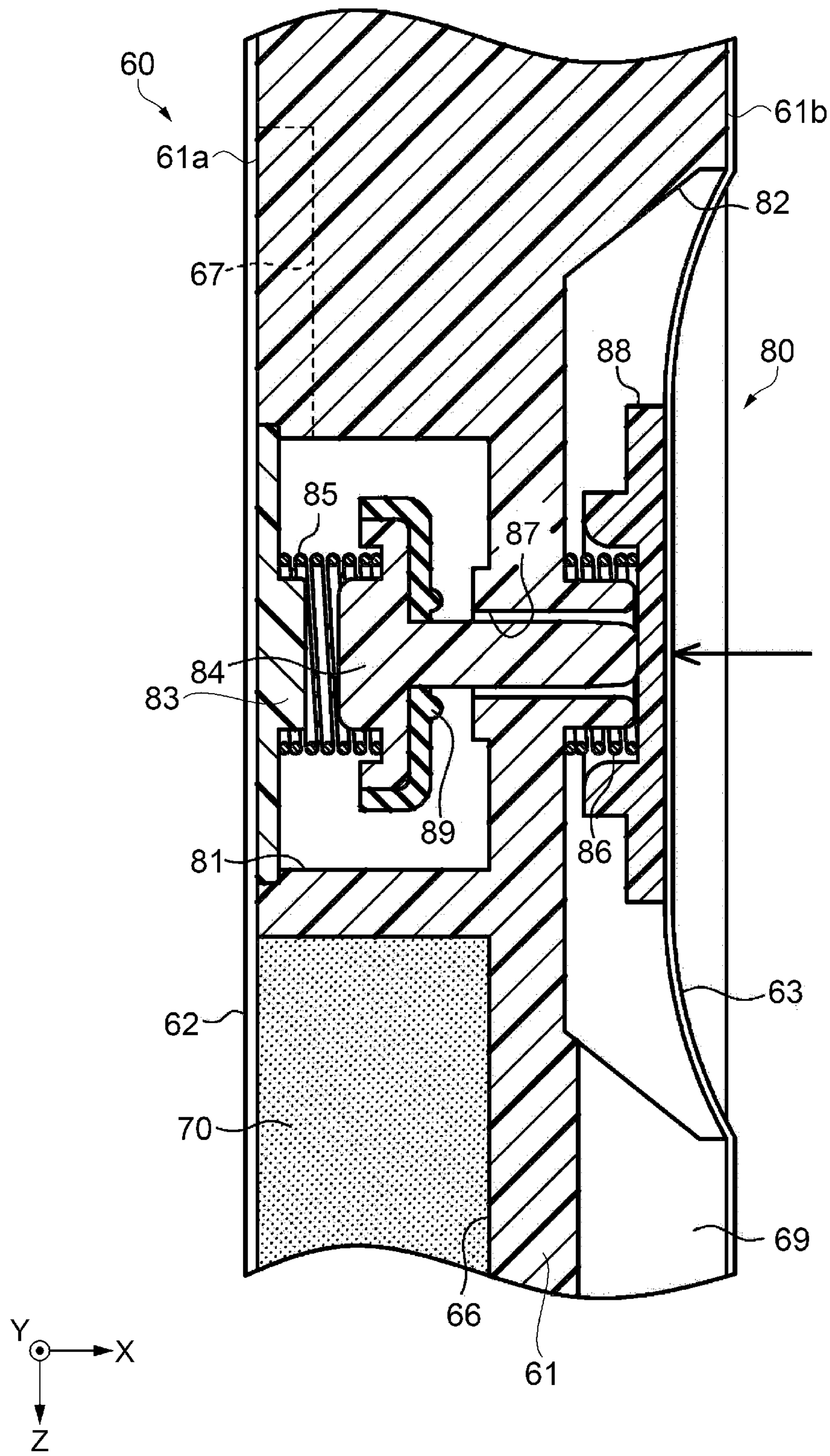
FIG. 5 is a cross-sectional view for explaining a configuration and an operation of a pressure adjustment mechanism.

FIGS. 4 and 5 are cross-sectional views for explaining a configuration and an operation of the pressure adjustment mechanism 80.

As shown in FIGS. 4 and 5, the pressure adjustment mechanism 80 includes, in addition to the pressure chamber 82 and the supply chamber 81, a valve body 84, a first biasing member 85, a second biasing member 86, a communication hole 87, and a pressure receiving plate 88. The pressure chamber 82 and the supply chamber 81 can communicate with each other via the communication hole 87, and the valve body 84 is inserted into the communication hole 87.

The valve body 84 includes a base end section arranged in the supply chamber 81 and a tip end section protruding into the pressure chamber 82 through the communication hole 87. A seal portion 89 is provided at the base end section of the valve body 84, and the valve body 84 is displaceable to a closed position (refer to FIG. 4) where the sealing section 89 closes the communication hole 87 and an open position (refer to FIG. 5) where the sealing section 89 opens the communication hole 87. The first biasing member 85 is accommodated in the supply chamber 81 and biases the valve body 84 toward the closed position.

The second biasing member 86 is accommodated in the pressure chamber 82, and is arranged so as to surround the tip end section of the valve body 84 that protrudes into the pressure chamber 82. One end of the second biasing member 86 is in contact with the pressure receiving plate 88 attached to the second membrane member 63, and the other end of the second biasing member 86 is in contact with a bottom surface of the recess section constituting the pressure chamber 82. The second biasing member 86 biases the pressure receiving plate 88 in a direction away from a tip end of the valve body 84 when the pressure receiving plate 88 approaches the tip end of the valve body 84.

Since the valve body 84 is biased by the first biasing member 85, the valve body 84 does not move to the open position even when pressure of the supply chamber 81 increases. On the other hand, when pressure in the pressure chamber 82 becomes lower than a predetermined pressure due to outflow of ink from the outflow section 65, the second membrane member 63 is displaced toward the inside of the pressure chamber 82. When the pressure receiving plate 88 pushes the tip end of the valve body 84, the valve body 84 moves to the open position. As a result, ink in the supply chamber 81 flows into the pressure chamber 82 through the communication hole 87, and thus pressure in the pressure chamber 82 increases. Then, when the second membrane member 63 is displaced toward the outside of the pressure chamber 82 due to an increase in pressure in the pressure chamber 82 and the pressure receiving plate 88 is separated from the tip end of the valve body 84, the valve body 84 moves from the open position to the closed position.

That is, when pressure in the pressure chamber 82 is reduced and the pressure receiving plate 88 presses the tip end of the valve body 84 against the biasing forces of the first biasing member 85 and the second biasing member 86, the valve body 84 moves to the open position. Before pressure in the pressure chamber 82 rises to positive pressure due to inflow of ink, the pressure receiving plate 88 separates from the valve body 84 by the biasing force of the second biasing member 86, so that pressure in the pressure chamber 82 is maintained in a range of negative pressure corresponding to the biasing force of the second biasing member 86.

Thus, the movement of the valve body 84 to the open position occurs due to the displacement of the second membrane member 63. An outer surface side of the second membrane member 63 is open to the atmosphere. That is, since the movement of the valve body 84 to the open position is performed by the differential pressure between the atmospheric pressure and pressure of the pressure chamber 82, the pressure adjustment mechanism 80 of the valve unit 60 is also referred to as a differential pressure valve mechanism or a self-sealing valve, and an autonomous pressure adjustment function by the differential pressure valve mechanism is also referred to as a self-sealing function.

As described above, the valve unit 60 can regulate flow of ink pressurized and supplied from the liquid supply source 21 to the liquid ejection head 10, and can maintain pressure of ink on a downstream side within a predetermined negative pressure range.

That is, when ink is ejected from the liquid ejection head 10, in the valve unit 60, ink flows out from the outflow section 65 and pressure of the pressure chamber 82 becomes lower than a predetermined pressure which is lower than the atmospheric pressure. Then, the second membrane member 63, which is displaced in a direction of reducing volume of the pressure chamber 82, moves the valve body 84 to the open position. As a result, ink flows from the communication hole 87 into the pressure chamber 82, and pressure in the pressure chamber 82 increases. When pressure in the pressure chamber 82 becomes equal to or higher than a predetermined pressure lower than the atmospheric pressure by supply of ink, the valve body 84 again regulates flow of ink from an upstream side.

When an external force is applied to the liquid ejection head 10, the meniscus formed in the nozzles N is broken by the impact of the external force, and ink may leak from the nozzles N. In order to suppress such leakage of ink, the valve unit 60 maintains the pressure chamber 82 positioned on an upstream side of the nozzles N at a predetermined negative pressure by the biasing force of the second biasing member 86.

Next, the second membrane member 63 constituting the valve unit 60 will be described.

Figure 6:
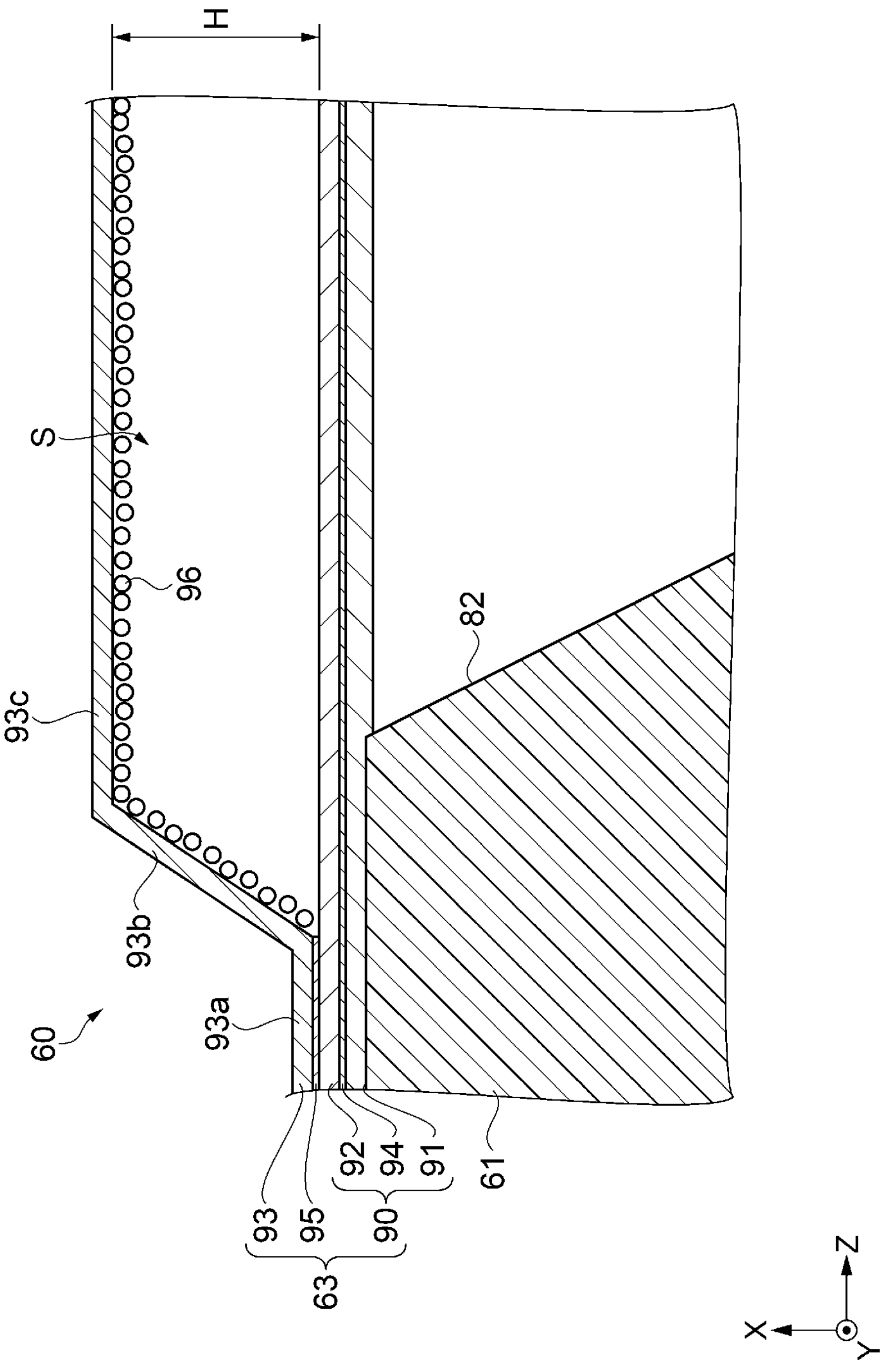
FIG. 6 is a cross-sectional view schematically showing a part of a pressure chamber of the valve unit.
Figure 7:
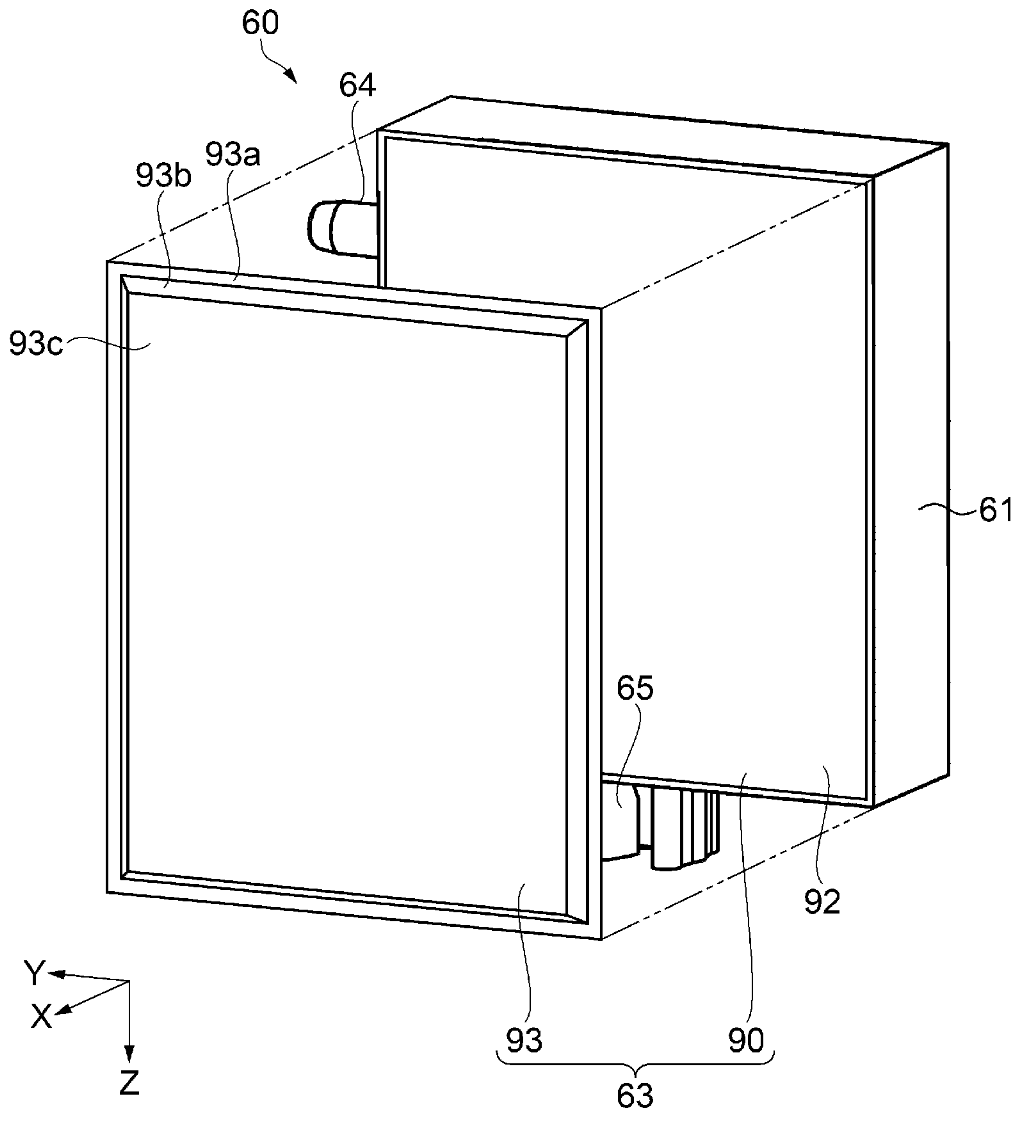
FIG. 7 is a perspective view showing a configuration of a second membrane member.

FIG. 6 is a cross-sectional view schematically showing a part of the pressure chamber 82 of the valve unit 60, and FIG. 7 is a perspective view showing a configuration of the second membrane member 63.

As shown in FIG. 6, the pressure chamber 82 is formed by covering the opening of the recess section provided in the liquid storage member 61 with the second membrane member 63. That is, the second membrane member 63 is arranged so as to cover the opening of the recess section. In the present embodiment, the second membrane member 63 is formed by laminating a first film 91, a second film 92, and a third film 93. Each of the first film 91, the second film 92, and the third film 93 is a film having flexibility.

The first film 91 is a film connected to the liquid storage member 61 by thermal welding, and is arranged so as to cover the opening of the recess section. Since the first film 91 is thermally welded to the liquid storage member 61, a material having high compatibility with PP, which is a material of the liquid storage member 61, is used as a material of the first film 91. In the present embodiment, cast polypropylene (CPP) is used as the material of the first film 91. In the present embodiment, the first film 91 has a thickness of about 25 μm.

The second film 92 is a film for suppressing permeation of a predetermined component contained in ink. Specifically, the second film 92 is provided to suppress the solvent component contained in ink from permeating and evaporating. Therefore, a material having a low solvent permeability is used as a material of the second film 92. In the present embodiment, polyethylene terephthalate (PET) is used as the material of the second film 92. In the present embodiment, the second film 92 has a thickness of about 12 μm. The second film 92 is adhered to an outer surface of the first film 91, that is, a surface opposite to a surface facing the opening of the recess section, using a polyurethane-based adhesive 94, for example. By this, a laminated film 90 in which the first film 91 and the second film 92 are laminated is formed.

The third film 93 is provided to suppress moisture contained in surrounding air from permeating and infiltrating the inside of the laminated film 90, that is, between the first film 91 and the second film 92. Therefore, a material having a low moisture permeability is used as a material of the third film 93. In the present embodiment, a vapor-deposited PET obtained by vapor-depositing alumina or silica on PET is used as the material of the third film 93. In the present embodiment, the third film 93 has a thickness of about 12 μm.

The third film 93 is formed in a convex shape by hot pressing in advance so as to be convex in the +X direction, which is a direction opposite to the direction facing the second film 92. By this hot pressing, a peripheral edge section 93*a*, a side wall section 93*b*, and a flat section 93*c* are formed in the third film 93. The peripheral edge section 93*a* is a section of a peripheral edge of the third film 93 to be adhered to the second film 92, and the side wall section 93*b* is a frame-shaped section rising up from an inner side of the peripheral edge section 93*a* in the +X direction. The flat section 93*c* is a section substantially parallel to the second film 92 in a central section of the third film 93. The peripheral edge section 93*a* and the side wall section 93*b* are provided along the peripheral edge of the third film 93, and most of the third film 93 is constituted by the flat section 93*c*.

The third film 93 is arranged on an outer surface of the second film 92, that is, a surface opposite to a surface facing the first film 91. Specifically, the peripheral edge section 93*a* of the third film 93 is adhered to an outer surface of the second film 92 by an adhesive 95. Thus, the second membrane member 63 including the first film 91, the second film 92, and the third film 93 is formed. As the adhesive 95, for example, an olefin-based hot melt adhesive is used.

Since the second membrane member 63 is formed as described above, a space S is provided in the second membrane member 63 between the second film 92 and the third film 93 in a range corresponding to the opening of the recess section constituting the pressure chamber 82. That is, the third film 93 is arranged separated from the second film 92 by a space S. Specifically, the flat section 93*c* of the third film 93 is arranged substantially parallel to the second film 92 with the space S therebetween. A peripheral edge of the space S sandwiched between the second film 92 and the flat section 93*c* is covered with the side wall section 93*b* of the third film 93.

As described above, since the space S is provided between the laminated film 90 and the third film 93, when the second membrane member 63 is deformed by change in pressure in the pressure chamber 82, the laminated film 90 of the second membrane member 63 is mainly deformed, and the third film 93 is not largely deformed. That is, the deformation of the laminated film 90 is hardly inhibited by the third film 93.

In the space S separating the second film 92 and the third film 93, granular moisture absorbing materials 96 are arranged. Before the third film 93 is adhered to the second film 92, the moisture absorbing material 96 is adhered to inner surfaces of the flat section 93*c* and the side wall section 93*b* of the third film 93, that is, a surface facing the second film 92. The moisture absorbing material 96 is made of, for example, silica gel. For example, an acrylic adhesive is used to adhere the moisture absorbing material 96 to the third film 93. The moisture absorbing material 96 is not essential, and the moisture absorbing material 96 may not be arranged.

The height H of the space S, that is, the dimension of the space S in the ±X direction may be appropriately determined according to the deformation amount of the laminated film 90, the particle size of the moisture absorbing material 96, and the like so that the second film 92 does not come into contact with the third film 93 when the laminated film 90 is deformed. For example, when the maximum displacement amount of the laminated film 90 in the ±X direction is 0.8 mm and the particle diameter of the moisture absorbing material 96 is several tens of μm, the height H of the space S is set to about 1.0 mm.

Next, the step of forming the second membrane member 63 on the liquid storage member 61 in a manufacturing method for the valve unit 60 will be described.

Figure 8:
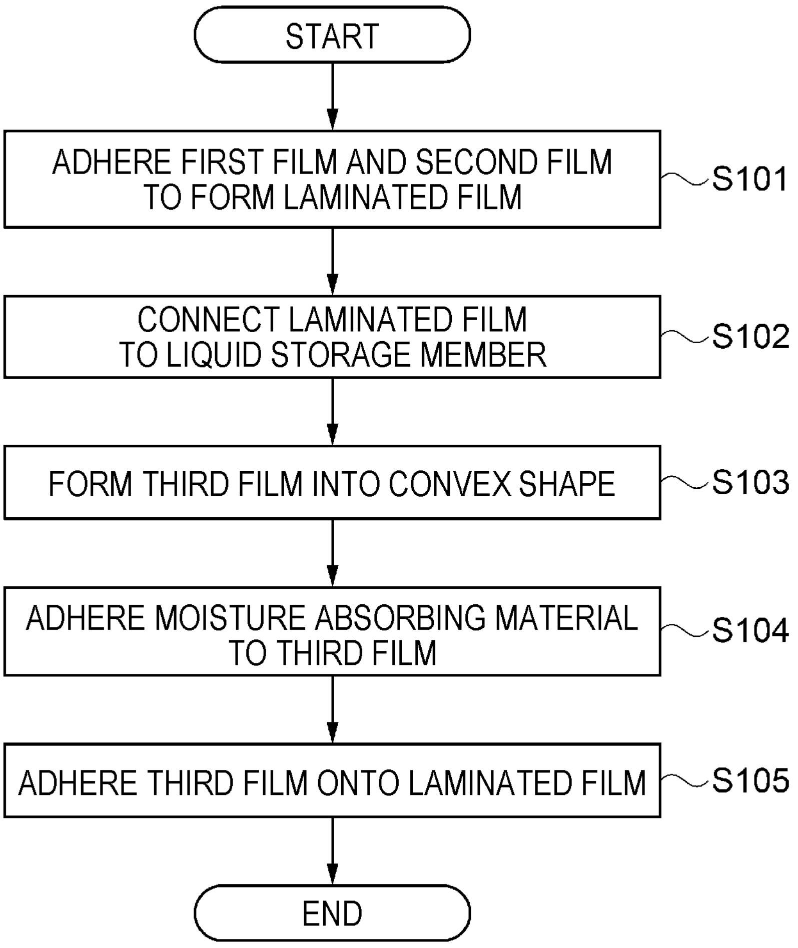
FIG. 8 is a flowchart for explaining steps of forming the second membrane member.

FIG. 8 is a flowchart for explaining steps of forming the second membrane member 63.

First, the first film 91 and the second film 92 are adhered to form the laminated film 90 (step S101). Then, the formed laminated film 90 is arranged so that a first film 91 side faces the recess section formed on the second surface 61*b* of the liquid storage member 61, and is then connected to the liquid storage member 61 by thermal welding (step S102).

Next, the third film 93 is arranged separated from the laminated film 90 by the space S. Specifically, the third film 93 is formed into a convex shape by hot pressing (step S103), and then the moisture absorbing material 96 is adhered to an inner surface of the third film 93 facing the second film 92 (step S104). Then, as shown in FIG. 7, the third film 93 is arranged on the laminated film 90 thermally welded to the liquid storage member 61, and the peripheral edge section 93*a* is adhered to the laminated film 90 (step S105). As a result, the third film 93 is arranged separated from the laminated film 90 by the space S. The second membrane member 63 is formed on the liquid storage member 61. The timing at which step S103 and step S104 are executed is not limited to after step S102, but it is sufficient that the timing is before step S105. Step S102 corresponds to the step of connecting the laminated film 90 to the liquid storage member 61, and steps S103 to S105 correspond to the step of placing the third film 93 separated from the laminated film 90 by the space S.

Similarly to the second membrane member 63, it is desirable that the first membrane member 62 is constituted by the first film 91 having high compatibility with the liquid storage member 61, the second film 92 which suppresses evaporation of a solvent component, and the third film 93 which suppresses infiltration of moisture. That is, the first membrane member 62 may have the same configuration as the second membrane member 63. However, since it is not necessary to consider the displacement of the first membrane member 62 in the ±X direction, there is no needs to provide the space S between the second film 92 and the third film 93. That is, the first membrane member 62 may have a configuration in which the third film 93 having a flat entire region is arranged on the laminated film 90 constituted by the first film 91 and the second film 92 without providing the space S.

As described above, according to the valve unit 60, the liquid ejection device 1, and the manufacturing method for the valve unit 60 of the present embodiment, the following effects can be obtained.

According to the present embodiment, the third film 93 for suppressing moisture contained in surrounding air from infiltrating between the first film 91 and the second film 92 is arranged separated from the second film 92 by the space S. For this reason, when the second membrane member 63 is deformed in accordance with change in pressure of ink in the pressure chamber 82, the first film 91 and the second film 92 adjacent to the recess section are mainly deformed, and the deformation of the third film 93 arranged with the space S therebetween is limited. That is, since the third film 93 is hindered from impairing flexibility of the first film 91 and the second film 92, pressure of ink in the pressure chamber 82 can be appropriately adjusted.

According to the present embodiment, since the third film 93 formed in a convex shape is arranged so as to be convex in a direction opposite to a direction facing the second film 92, the space S can be easily formed between the second film 92 and the third film 93.

According to the present embodiment, since the moisture absorbing material 96 is arranged in the space S separating the second film 92 from the third film 93, it is possible to further suppress that moisture infiltrates in between the first film 91 and the second film 92.

According to the present embodiment, since the moisture absorbing material 96 is granular and is adhered to the third film 93, it is possible to suppress that the moisture absorbing material 96 inhibits the deformation of the first film 91 and the second film 92.

The above embodiment may be modified as follows.

In the above embodiment, the materials of the liquid storage member 61, the first film 91, the second film 92, the third film 93, the adhesives 94, 95, and the moisture absorbing material 96 are not limited to the materials exemplified above. For example, the third film 93 is not limited to vapor-deposited PET in which alumina or silica is vapor-deposited on PET, but may be vapor-deposited PET in which both alumina and silica are vapor-deposited on PET. Instead of vapor-deposited PET, polyvinylidene chloride (PVDC) may be used. The moisture absorbing material 96 is not limited to silica gel, and may be calcium oxide, calcium chloride, or the like. The form of the moisture absorbing material 96 is not limited to a granular form, and may be a sheet form or the like.

Figure 9:
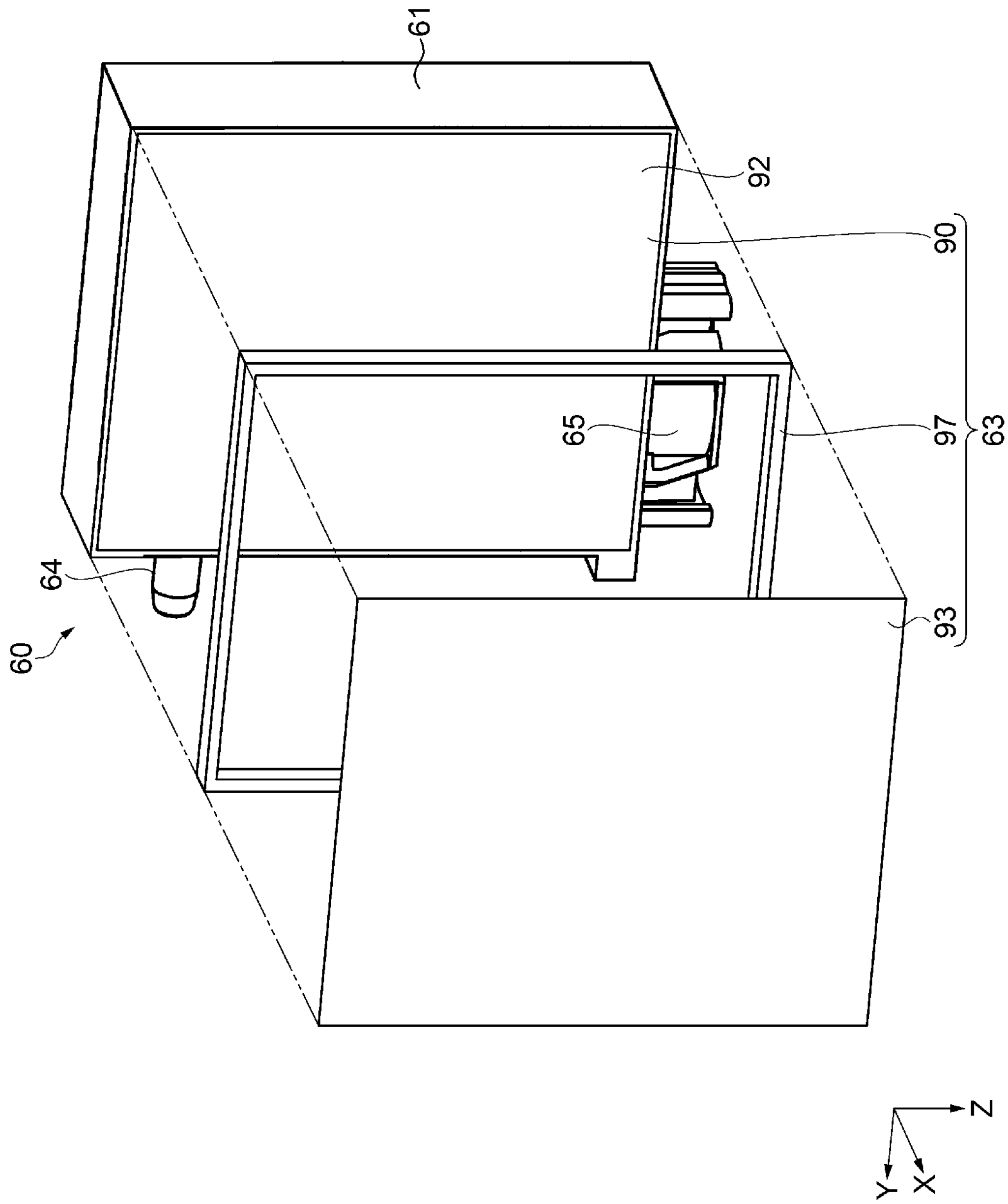
FIG. 9 is a perspective view showing a configuration of the second membrane member according to a modification.

In the above embodiment, the space S is formed between the second film 92 and the third film 93 by forming the third film 93 in a convex shape, but the present disclosure is not limited to this configuration. For example, as shown in FIG. 9, a frame-shaped member 97 may be arranged on the laminated film 90, and a third film 93 having a flat entire region may be arranged on the frame-shaped member 97. In this case, the second membrane member 63 includes the first film 91, the second film 92, the frame-shaped member 97, and the third film 93, and the third film 93 is connected to the second film 92 via the frame-shaped member 97. According to this configuration, in order to provide the space S between the second film 92 and the third film 93, it is not necessary to process the third film 93 into a convex shape.

In the above embodiment, the moisture absorbing material 96 is adhered to an inner surfaces of the flat section 93*c* and the side wall section 93*b* of the third film 93, but the moisture absorbing material 96 may be adhered to an inner surface of the side wall section 93*b*, and the moisture absorbing material 96 may not be adhered to an inner surface of the flat section 93*c*. According to this configuration, the moisture absorbing material 96 is arranged so as to avoid a region where the laminated film 90 is largely deformed, so that the moisture absorbing material 96 is suppressed from inhibiting the deformation of the laminated film 90. The moisture absorbing material 96 may not be arranged in a region of the flat section 93*c* corresponding to a central section of the opening of the recess section where the displacement of the laminated film 90 is maximized, and the moisture absorbing material 96 may be arranged in the periphery of the region of the flat section 93*c*.

Figure 10:
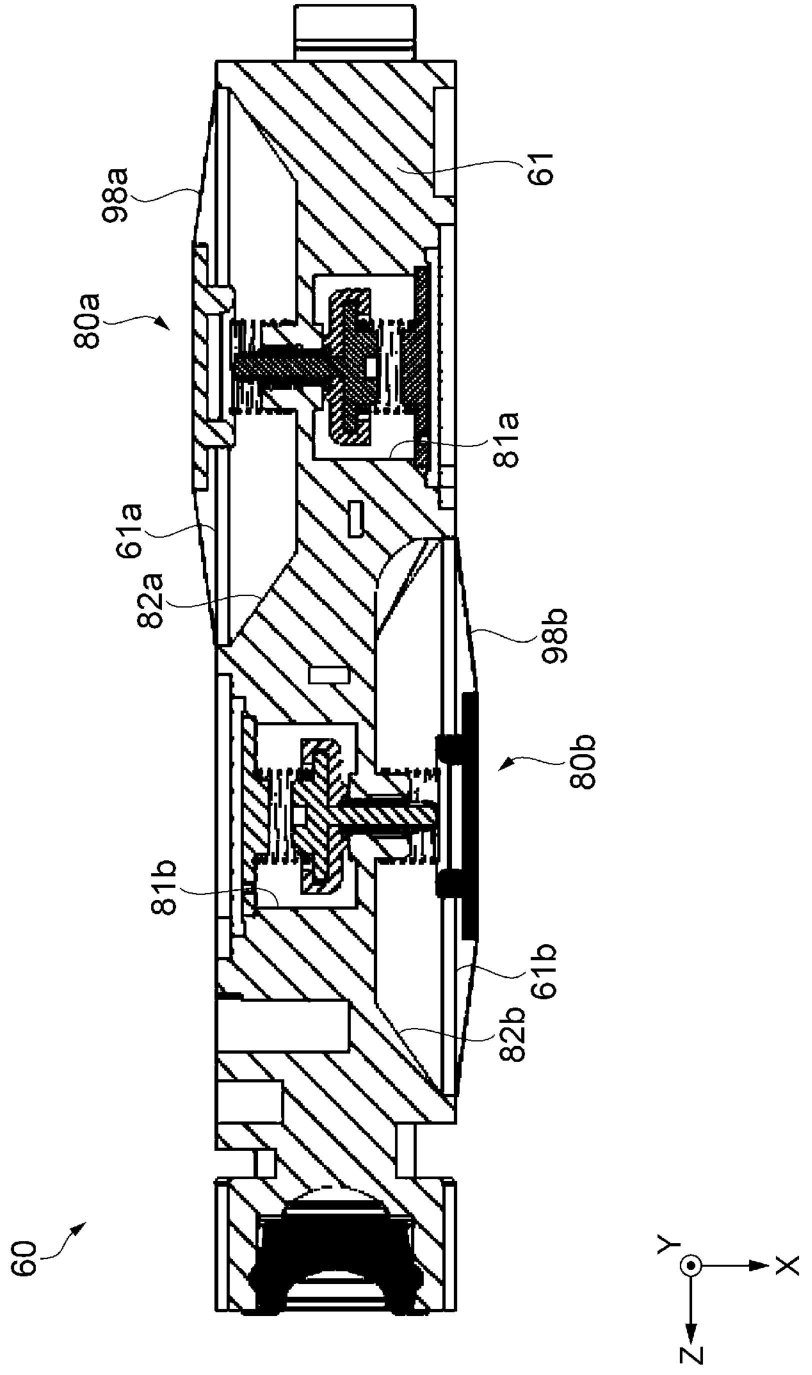
FIG. 10 is a cross-sectional view showing the valve unit according to a modification.

Although the valve unit 60 is arranged on the carriage 42 and connected to the liquid ejection head 10 in the above embodiment, the configuration of the valve unit 60 is not limited thereto. For example, the valve unit 60 may be configured integrally with the liquid ejection head 10, or may be configured integrally with the liquid supply source 21. As shown in FIG. 10, one valve unit 60 may be configured to be capable of storing a plurality of kinds of ink.

In the configuration shown in FIG. 10, the valve unit 60 can store two kinds of ink, and is provided with two pressure adjustment mechanisms 80*a* and 80*b*. Two kinds of ink flow into the valve unit 60 from different inflow sections and flow out from different outflow sections. One of the pressure adjustment mechanisms 80*a* includes a pressure chamber 82*a* formed on a first surface 61*a* side of the liquid storage member 61. The pressure chamber 82*a* is supplied with ink from a supply chamber 81*a* formed on a second surface 61*b* side. The other pressure adjustment mechanism 80*b* includes a pressure chamber 82*b* formed on a second surface 61*b* side of the liquid storage member 61. The pressure chamber 82*b* is supplied with ink from a supply chamber 81*b* formed on a first surface 61*a* side.

Thus, in the configuration shown in FIG. 10, the pressure chambers 82*a* and 82*b* are formed in both the first surface 61*a* and the second surface 61*b*. Therefore, it is desirable that both of a first membrane member 98*a* arranged on the first surface 61*a* and a second membrane member 98*b* arranged on the second surface 61*b* have the same configuration as the second membrane member 63 in the above embodiment, that is, the third film 93 is arranged separated from the second film 92 by the space S.

In the above embodiment, the liquid ejection device 1 may be a device that ejects liquid other than ink. For example, the liquid ejection device 1 may eject a liquid body in which a material such as an electrode material or a color material used for manufacturing various displays is contained in a dispersed or dissolved state.

The following is a description of what can be derived from the embodiments.

A valve unit includes a liquid storage chamber whose volume changes in accordance with change in pressure of liquid, wherein the liquid storage chamber is formed by a liquid storage member in which is formed a recess section storing the liquid, and a membrane member arranged so as to cover an opening of the recess section, the membrane member includes a first film connected to the liquid storage member so as to cover the opening, a second film that is adhered to a surface of the first film opposite from a surface of the first film facing the opening and that suppresses permeation of a predetermined component contained in the liquid, and a third film that is arranged at a surface of the second film opposite from a surface of the second film facing the first film and that suppresses permeation of moisture contained in surrounding air, and the third film is arranged separated from the second film by a space.

According to this configuration, the third film for suppressing moisture contained in surrounding air from infiltrating between the first film and the second film is arranged separated from the second film by the space. For this reason, when the membrane member is deformed in accordance with change in pressure of liquid in the liquid storage chamber, the first film and the second film, which are adjacent to the recess section, are mainly deformed, and deformation of the third film arranged with the space therebetween is limited. That is, since the third film is suppressed from impairing flexibility of the first film and the second film, pressure of liquid in the liquid storage chamber can be appropriately adjusted.

The above valve unit is desirable to be configured such that the third film is formed in a convex shape and is arranged so as to be convex in a direction opposite to a direction facing the second film.

According to this configuration, since the third film formed in a convex shape is arranged so as to be convex in a direction opposite to a direction facing the second film, the space can be easily formed between the second film and the third film.

The above valve unit is desirable to be configured such that a moisture absorbing material is arranged in the space separating the second film and the third film.

According to this configuration, since the moisture absorbing material is arranged in the space separating the second film from the third film, it is possible to further suppress moisture from infiltrating between the first film and the second film.

The above valve unit is desirable to be configured such that the moisture absorbing material is granular and adhered to the third film.

According to this configuration, since the moisture absorbing material is granular and is adhered to the third film, it is possible to suppress the moisture absorbing material from inhibiting the deformation of the first film and the second film.

The above valve unit is desirable to be configured such that a moisture absorbing material is arranged in the space separating the second film and the third film, the third film includes a flat section arranged substantially parallel to the second film with the space therebetween, and a side wall section that covers a peripheral edge of the space sandwiched between the second film and the flat section, and the moisture absorbing material is adhered to the side wall section of the third film, and is not adhered to the flat section of the third film.

According to this configuration, the moisture absorbing material is arranged so as to avoid a region where the membrane member is largely deformed, so that the moisture absorbing material is suppressed from inhibiting the deformation of the first film and the second film.

The above valve unit may be configured such that the third film is connected to the second film via a frame-shaped member.

According to this configuration, in order to provide the space between the second film and the third film, it is not necessary to process the third film into a convex shape.

A liquid ejection device includes a liquid ejection head configured to eject liquid and a supply flow path connecting a liquid supply source and the liquid ejection head such that the liquid flows from the liquid supply source toward the liquid ejection head, wherein the supply flow path includes a valve unit including an inflow section into which the liquid flows from the liquid supply source, an outflow section from which the liquid flows toward the liquid ejection head, and a liquid storage chamber whose volume changes in accordance with change in pressure of the liquid, the liquid storage chamber is formed by a liquid storage member in which is formed a recess section storing the liquid, and a membrane member arranged so as to cover an opening of the recess section, the membrane member includes a first film connected to the liquid storage member so as to cover the opening, a second film that is adhered to a surface of the first film opposite from a surface of the first film facing the opening and that suppresses permeation of a predetermined component contained in the liquid, and a third film that is arranged at a surface of the second film opposite from a surface of the second film facing the first film and that suppresses permeation of moisture contained in surrounding air, and the third film is arranged separated from the second film by a space.

According to this configuration, the third film for suppressing moisture contained in surrounding air from infiltrating between the first film and the second film is arranged separated from the second film by the space. For this reason, when the membrane member is deformed in accordance with change in pressure of liquid in the liquid storage chamber, the first film and the second film, which are adjacent to the recess section, are mainly deformed, and deformation of the third film arranged with the space therebetween is limited. That is, since the third film is suppressed from impairing flexibility of the first film and the second film, pressure of liquid in the liquid storage chamber can be appropriately adjusted.

A manufacturing method for a valve unit, the valve unit including a liquid storage chamber that is formed by a liquid storage member in which is formed a recess section in which liquid is stored, and a membrane member that is arranged to cover an opening of the recess section, and whose volume changes in accordance with change in pressure of the liquid, the manufacturing method includes a step of arranging a laminated film formed by adhering a first film connected to the liquid storage member and a second film suppressing permeation of a predetermined component contained in the liquid so that a first film side faces the recess section, and connecting the laminated film to the liquid storage member and a step of arranging a third film that suppresses permeation of moisture contained in surrounding air separated from the laminated film by a space.

According to this configuration, the third film for suppressing moisture contained in surrounding air from infiltrating between the first film and the second film is arranged separated from the second film by the space. For this reason, when the membrane member is deformed in accordance with change in pressure of liquid in the liquid storage chamber, the first film and the second film, which are adjacent to the recess section, are mainly deformed, and deformation of the third film arranged with the space therebetween is limited. That is, since the third film is suppressed from impairing flexibility of the first film and the second film, pressure of liquid in the liquid storage chamber can be appropriately adjusted.

What is claimed is:

1. A valve unit comprising:

a liquid storage chamber whose volume changes in accordance with change in pressure of liquid, wherein the liquid storage chamber is formed by a liquid storage member in which is formed a recess section storing the liquid, and a membrane member arranged so as to cover an opening of the recess section, the membrane member includes a first film connected to the liquid storage member so as to cover the opening, a second film that is adhered to a surface of the first film opposite from a surface of the first film facing the opening and that suppresses permeation of a predetermined component contained in the liquid, and a third film that is arranged at a surface of the second film opposite from a surface of the second film facing the first film and that suppresses permeation of moisture contained in surrounding air, and the third film is arranged separated from the second film by a space, wherein the third film is formed in a convex shape and is arranged so as to be convex in a direction opposite to a direction facing the second film, wherein the third film includes a flat section arranged substantially parallel to the second film with the space therebetween, and a side wall section that covers a peripheral edge of the space sandwiched between the second film and the flat section.

2. The valve unit according to claim 1, wherein the third film is formed in a convex shape and is arranged so as to be convex in a direction opposite to a direction facing the second film.

3. The valve unit according to claim 1, wherein a moisture absorbing material is arranged in the space separating the second film and the third film.

4. The valve unit according to claim 3, wherein the moisture absorbing material is granular and adhered to the third film.

5. The valve unit according to claim 1, wherein a moisture absorbing material is arranged in the space separating the second film and the third film, and the moisture absorbing material is adhered to the side wall section of the third film, and is not adhered to the flat section of the third film.

6. The valve unit according to claim 1, wherein the third film is connected to the second film via a frame-shaped member.

7. A liquid ejection device comprising:

a liquid ejection head configured to eject liquid and a supply flow path connecting a liquid supply source and the liquid ejection head such that the liquid flows from the liquid supply source toward the liquid ejection head, wherein the supply flow path includes a valve unit including an inflow section into which the liquid flows from the liquid supply source, an outflow section from which the liquid flows toward the liquid ejection head, and a liquid storage chamber whose volume changes in accordance with change in pressure of the liquid, the liquid storage chamber is formed by a liquid storage member in which is formed a recess section storing the liquid, and a membrane member arranged so as to cover an opening of the recess section, the membrane member includes a first film connected to the liquid storage member so as to cover the opening, a second film that is adhered to a surface of the first film opposite from a surface of the first film facing the opening and that suppresses permeation of a predetermined component contained in the liquid, and a third film that is arranged at a surface of the second film opposite from a surface of the second film facing the first film and that suppresses permeation of moisture contained in surrounding air, and the third film is arranged separated from the second film by a space, wherein the third film is formed in a convex shape and is arranged so as to be convex in a direction opposite to a direction facing the second film, wherein the third film includes a flat section arranged substantially parallel to the second film with the space therebetween, and a side wall section that covers a peripheral edge of the space sandwiched between the second film and the flat section.

* * * * *